United States Patent [19]

Shimizu et al.

[11] Patent Number: 5,656,681
[45] Date of Patent: Aug. 12, 1997

[54] GRAFTING REACTION PRODUCT AND METHOD FOR PRODUCING THE SAME

[75] Inventors: Toshiyuki Shimizu; Shinya Higashiura; Minoru Wada; Hideki Tanaka; Masakatsu Ohguchi, all of Ohtsu, Japan

[73] Assignee: Toyo Boseki Kabushiki Kaisha, Osaka, Japan

[21] Appl. No.: 471,493

[22] Filed: Jun. 6, 1995

[30] Foreign Application Priority Data

Jun. 7, 1994 [JP] Japan ................. 6-125316

[51] Int. Cl.⁶ .................................. C08F 283/01
[52] U.S. Cl. ................. 523/501; 525/38; 525/39; 525/46; 525/48; 525/169; 525/170
[58] Field of Search .................... 525/38, 39, 46, 525/48, 169, 170; 523/501

[56] References Cited

U.S. PATENT DOCUMENTS

| 3,634,351 | 1/1972 | Kimura et al. |
| 3,832,268 | 8/1974 | Smith. |
| 4,517,322 | 5/1985 | Birkmeyer et al. |
| 5,449,707 | 9/1995 | Higashiura .............. 523/501 |

FOREIGN PATENT DOCUMENTS

| 189315 | 7/1986 | European Pat. Off. |
| 339566 | 11/1989 | European Pat. Off. |
| C-942297 | 4/1956 | Germany. |
| 46-7705 | 2/1971 | Japan. |
| 48-19559 | 6/1973 | Japan. |
| 54-36394 | 3/1979 | Japan. |
| 54-39488 | 3/1979 | Japan. |
| 57-38810 | 3/1982 | Japan. |
| 57-57065 | 12/1982 | Japan. |
| 59-223374 | 12/1984 | Japan. |
| 60-42809 | 9/1985 | Japan. |
| 61-200109 | 9/1986 | Japan. |
| 61-57874 | 12/1986 | Japan. |
| 62-225510 | 10/1987 | Japan. |
| 1-36842 | 8/1989 | Japan. |
| 2-102214 | 4/1990 | Japan. |
| 3-294322 | 12/1991 | Japan. |
| 5-501124 | 3/1993 | Japan. |
| 5-186543 | 7/1993 | Japan. |
| 5-230166 | 9/1993 | Japan. |
| 5-262870 | 10/1993 | Japan. |
| WO-A-89/08670 | 9/1989 | WIPO. |

*Primary Examiner*—Patricia A. Short
*Attorney, Agent, or Firm*—Fish & Neave

[57] ABSTRACT

The grafting reaction product of the present invention includes a main chain having a polymer selected from one of a polyester and a polyester polyurethane consisting mainly of the polyester, the polyester containing 60 mole % or more of an aromatic dicarboxylic acid for the amount of the total carboxylic acids. The grafting reaction product further includes a plurality of side chains which are polymers of radical polymerizable monomers, said radical polymerizable monomers having at least 30% by weight of the combination of at least one electron accepting monomers (A) having an e value of 0.9 or more and at least one electron donative monomers (B) having an e value of −0.6 or less for the amount of the total radical polymerizable monomers, and at least 10% by weight of an aromatic radical polymerizable monomer for the amount of the total radical polymerizable monomers. According to the present invention, the plurality of side chains are grafted into the main chain to form the grafting reaction product.

8 Claims, No Drawings

GRAFTING REACTION PRODUCT AND METHOD FOR PRODUCING THE SAME

BACKGROUND OF THE INVENTION

1. Field of the Invention

The present invention relates to a grafting reaction product. Specifically, the present invention relates to graft modified polyester resins and graft modified polyester polyurethane resins which have excellent mechanical properties and are useful as vehicles for paints, inks, coating agents, adhesives, and the like; and as processing agents for fibers, films, paper products, and the like. The grafting reaction product can be utilized in any form including solvent soluble-types and water dispersion-types.

2. Description of the Related Art

A number of techniques for polymerizing radical polymerizable monomers with polyester resins and polyurethane resins to obtain graft or block reaction products have been published. The graft or block reaction products have been studied for improving a wide variety of functions improving, for example, the impact resistance of molding compounds by using them as a compatibilizer, the adhesiveness of paints and adhesives to substrates, the curing property of the paints and adhesives, and the dispersibility of pigments, and the like.

The graft modification of low molecular weight polyesters and dispersion of such graft polyesters have heretofore been known in the art, and disclosed in, for example, U.S. Pat. Nos. 3,634,351 and 4,517,322, and Japanese Patent Publication No. 57-57065. However, since the polyesters used for these purposes are classified into alkyd resins or unsaturated polyester resins, it is difficult to prepare graft polyester having high molecular weight. Thus, in the case where such graft polyesters are utilized for coating films, the resulting films have such drawbacks as low bending workability, poor water resistance, etc.

The modifications of high molecular weight polyesters introduce polymerizable unsaturated double bonds into the main chain or molecular terminal and polymerize the double bonds with radical polymerizable monomers by graft or block polymerization. The examples of graft or block modifications are disclosed in Japanese Laid-open Patent Publications Nos. 57-38810, 3-294322 and 5-262870. The examples of dispersion of modified polyesters are disclosed in Japanese Patent Publication No. 61-57874, and Japanese Laid-open Patent Publications Nos. 59-223374, 61-200109 and 62-225510.

Examples of similar graft or block modifications for polyurethane resins are disclosed in Japanese Patent Publications Nos. 48-19559 and 1-36842, and Japanese Laid-open Patent Publications Nos. 2-102214 and 5-230166. A dispersion of such modified polyurethane is prepared by introducing hydrophilic functional groups into the graft or block chain. The examples of such dispersion are disclosed in Japanese Patent Publication No. 46-7705, Japanese Laid-open Patent Publications Nos. 54-36394, 54-39488 and 5-186543 and Japanese National Patent Publication No. 5-501124 (WO91/15528). All of these modifications are made by graft or block polymerization in an organic solvent. Alternatively, a dispersion of modified polyurethane is prepared by introducing hydrophilic groups into monomers which form polyurethane main chain, and then by aqueous emulsion polymerizing the monomers. The examples of the dispersion are disclosed in several publications including typically Japanese Patent Publication No. 60-42809.

However, in the case where a high molecular weight polyester or polyurethane is grafted for the modification, since the polyester or polyurethane having a higher molecular weight is more likely to cause the crosslinking between the polyester molecules or the polyurethane molecules, the graft polymer is more likely to gel. Regardless of this problem, these prior art publications only illustrate a wide variety of radical polymerizable monomers used for the grafting reaction. The publications fail to describe monomers which avoid the gelation and provide a higher grafting efficiency. In addition, the publication fail to describe a molecular design which prevents the deterioration of mechanical property caused by grafting reaction.

As described above, in the case where a radical polymerizable monomer is grafted into the side chain of a polymer containing radical polymerizable unsaturated double bonds in its main chain, the following problems are unsolved. (1) The graft polymer often causes the gelation. When the reaction conditions are selected to avoid the gelation, no bonding reaction occurs between the main chain component and the side chain component. As a result, since the reaction product is only a blend of the main chain component and the side chain component, the purpose for the modification cannot be accomplished. (2) The monomer proportion of the side chain component actually obtained does not corresponds to that of the original component. As a result, a desirable property cannot be obtained and therefore the purpose for the modification cannot sufficiently be accomplished. (3) As the most important problem in practice, the mechanical properties of the grafting reaction product are largely reduced, compared to those of the main chain polymer, i.e. the polymer which is not grafted.

The present inventors have eagerly studied the means for solving the above-discussed three subject matters. With regard to above-discussed problems (1) and (2), by considering the electron situation of the polymerizable unsaturated double bond introduced into the main chain, the effective combinations of electron. accepting monomers and electron donative monomers have been found. With regards to above-discussed problem (3), by introducing an aromatic unsaturated monomer into the side chain, the compatibility between the main chain and the side chain have been improved due to the mutual action of the aromatic rings. As a result, the mechanical properties of the graft polymer have been remarkably improved compared to those of the conventional graft polymers. In this manner, the present invention has been accomplished.

SUMMARY OF THE INVENTION

The grafting reaction product of this invention includes a main chain including a polymer selected from one of a polyester and a polyester polyurethane consisting mainly of the polyester, the polyester containing about 60 mole % or more of an aromatic dicarboxylic acid for the amount of total carboxylic acids. The grafting reaction product further includes a plurality of, side chains including polymers of radical polymerizable monomers, said radical polymerizable monomers including at least 30% by weight of the combination of an electron accepting monomer (A) having an e value of about 0.9 or more and an electron donative monomer (B) having an e value of about −0.6 or less for the amount of total radical polymerizable monomers, and at least about 10% by weight of an aromatic radical polymerizable monomer for the amount of the total radical polymerizable monomers. The plurality of side chains are grafted into the main chain to form the grafting reaction product.

In one embodiment of the invention, the radical polymerizable monomers include about 20 to about 80% by weight of the electron accepting monomer (A), about 20 to about 80% by weight of the electron donative monomer (B), and 0 to about 50% by weight of a radical polymerizable monomer (C) other than the monomers (A) and (B), and the electron donative monomer (B) and the radical polymerizable monomer (C) include about 10 to about 80% by weight of said aromatic radical polymerizable monomer for the amount of the total radical polymerizable monomers.

In another embodiment of the invention, the polyester component in the main chain has a weight average molecular weight of about 5000 to about 100000, and includes about 0.5 to about 20 mole % of a dicarboxylic acid having polymerizable unsaturated double bonds for the total carboxylic acids and/or about 0.5 to about 20 mole % of a diol having polymerizable unsaturated double bonds for the total diols, and the sum of the dicarboxylic acid and the diol is up to about 20 mole % for the total acids and diols.

In another embodiment of the invention, the polyester polyurethane has a weight average molecular weight of about 5000 to about 100000, and an urethane bond content of about 500 to about 4000 equivalents/$10^6$ g, and on average about 1.5 to about 30 of polymerizable unsaturated double bonds for one molecule of said polyester polyurethane.

In another embodiment of the invention, the weight ratio of the polymer constituting the main chain to the radical polymerizable monomers forming the side chains is about 25/75 to about 99/1.

In another embodiment of the invention, a film obtained from a solution, in which the polymer constituting the main chain and the polymer constituting the side chains are dissolved, is transparent.

In another embodiment of the invention, the grafting reaction product has an acid number of 200 to 4000 equivalents/$10^6$ g.

In another embodiment of the invention, the acid groups of the grafting reaction product are neutralized with a basic compound, and the grafting reaction product is dispersed in an aqueous medium.

According to another aspect of the invention, a method for producing a grafting reaction product is provided. The method includes the steps of adding radical polymerizable monomers having an e value not largely different from the e value of polymerizable unsaturated double bonds of a polymer selected from a polyester and a polyester polyurethane consisting mainly of the polyester; and reacting the polymer with the radical polymerizable monomers by adding radical polymerizable monomers having an e value largely different from the e value of polymerizable unsaturated double bonds of the polymer and a polymerization initiator.

Thus, the invention described herein makes possible the advantages of (1) providing a grafting reaction product without damaging the mechanical properties of the base resin (i.e. the main chain); (2) providing a grafting reaction product which provides coating film having excellent physical and chemical properties (e.g. mechanical property, appearance, workability, adhesiveness, water resistance, boiling water resistance, retort resistance, hardness, gloss, contamination resistance, and the like); (3) providing a grafting reaction product which can be preferably used in various final use (e.g. paints, inks, adhesives, and various coating agents); (4) providing a method for producing such grafting reaction product without gelation, which is simple and useful for industrial practice; and (5) providing a dispersion containing such grafting reaction product.

These and other advantages of the present invention will become apparent to those skilled in the art upon reading and understanding the following detailed description.

DESCRIPTION OF THE PREFERRED EMBODIMENTS

In the specification, "an electron accepting monomer" means a radical polymerizable monomer having an e value of 0.9 or more, and "an electron donative monomer" means a radical polymerizable monomer having an e value of −0.6 or less. The e value was proposed as the Q-e value by Alfrey-Price, and is well known to those skilled in the art of polymer chemistry.

The e value of the Q-e values in radical copolymerization is generally a value indicating empirically the electron state in the unsaturated bond of a radical polymerizable monomer. When there is no great difference in the Q value of the monomers, the e value is believed to be useful for the interpretation of the copolymerization reaction of the monomers, as provided by "Polymer Handbook 3rd ed., John Wiley and Sons", and the like.

The radical polymerizable monomers used for forming a side chain in the present invention are made up of mainly the combination of the electron accepting monomer and the electron donative monomer. The electron accepting monomer has an e value of 0.9 or more, desirably 1.0 or more, and more desirably 5 or more. The electron donative monomer has an e value of −0.6 or less, desirably −0.7 or less, and more desirably −0.8 or less.

The fact that a monomer has a larger e value in the negative side indicates that the monomer has a stronger electron donative substituent. Thus, an electric charge of the polymerizable unsaturated double bond and the radical produced therefrom is shifted negatively, due to that the electron density in the polymerizable unsaturated double is high. Conversely, the fact that a monomer has a larger e value in the positive side indicates that the monomer has a strong electron attractive substituent. Thus, an electric charge of the polymerizable unsaturated double bond and the radical produced therefrom is shifted positively, due to that the electron density in the polymerizable unsaturated double is low. When monomers having reverse electron conditions, for example, an electron donative monomer, i.e., a monomer having a larger e value in the negative side, and an electron accepting monomer, i.e., a monomer having a larger e value in the positive side are copolymerized, any radical produced from each monomer during the polymerization is more likely to add to a monomer having an e value opposite (positive or negative) to the e value of the monomer from which the radical is produced. This trend is more remarkable in the case where the difference between the e values of the monomers is larger. As described above, monomers having largely different e values are actually more likely to be copolymerized to each other. Since a random copolymerization, not a block copolymerization, tends to occur between these monomers, it is possible to approach duplication of original composition with the composition of the side chain actually obtained.

The polymerizable unsaturated double bond in the resin to be modified is derived from an unsaturated dicarboxylic acid such as fumaric acid, itaconic acid, and the like; or an allyl compound having a hydroxyl group or a carboxyl group, such as glycerin monoallyl ether, and the like. The unsaturated dicarboxylic acid has a much larger e value of 1.0 to 3.0 (or 1.0 to 2.0 in the case of the diester of the unsaturated dicarboxylic acid) in the positive side due to the presence of an electron attractive carboxyl group as a substituent in the unsaturated bond. Therefore, an electric charge is shifted positively in the unsaturated bond. On the other hand, the allyl compound has a much larger e value of −1.0 to −2.0 in the negative side due to the presence of the allyl resonance. Therefore, an electric charge is shifted negatively in the unsaturated bond. In the case of grafting a resin, the use of a radical polymerizable monomer which is highly copolymerizable with the unsaturated bond of the resin to be modified (i.e., the use of the monomer and the resin having an e value opposite (positive or negative) to each other, and a larger difference between the e values of both) makes it possible to prevent the homopolymerization of the monomer. The homopolymerization means that the monomer is not reacted with the resin to be modified. For example, the modified resin copolymerized with fumaric acid that has a larger e value in the positive side is more likely to copolymerize with a monomer having a larger e value in the negative side. On the other hand, the modified resin containing an allyl group that has a larger e value in the negative side is more likely to copolymerize a monomer having an e value in the positive side. In both cases, the grafting efficiency of the resin is improved, and the amount of the homopolymer which is not reacted with the resin to be modified can be reduced.

Moreover, the present invention is characterized in that the combination of the electron accepting monomer and the electron donative monomer can control the gelation of the resin. When a resin having a small amount of unsaturated bonds is modified with a radical polymerizable monomer, a sufficient grafting reaction did not heretofore occur, so that the homopolymer of the radical polymerizable monomer is produced. On the other hand, when the resin has a large amount of unsaturated bonds, the coupling reaction between the grafted side chains causes the gelation of the polymer. Therefore, the amount of the unsaturated bonds which is actually available in the resin to be modified is in an extremely narrow range in the prior art techniques. However, the present invention makes it possible to control the gelation by using the combination of the electron accepting monomer and the electron donative monomer, even if the resin has a very large amount of unsaturated bonds. The combination of the monomers having an e value outside of the above-described range provides little effect.

Also, it is important that the side chain include the combination of the electron accepting monomer and the electron donative monomer, and also include an aromatic radical polymerizable monomer. The present inventors have repeatedly examined the causes for the reduction of various properties, especially mechanical properties, water resistance, and the like of the resin due to its modification, and found that in the case where the resin to be modified is an aromatic polyester or polyester polyurethane (hereinafter abbreviatedly referred to as a base resin), its mechanical properties are varied depending on the composition of the side chain. For example, in the case where an aromatic radical polymerizable monomer is utilized as one of the components for the side chain to increase the compatibility between the main chain and the side chain, the reduction of the mechanical properties of the resin is largely controlled. The lack of an aromatic radical polymerizable monomer provides a lower compatibility between the main chain and the side chain, resulting in substantial reduction of various properties of the resin, especially the reduction of the elongation of the coating film obtained from the resin.

Polyesters

The polyester used for the grafting reaction product of the present invention is a polyester containing 60 mole % or more of an aromatic dicarboxylic acid for the amount of the total carboxylic acids, and 0 to 40% of an aliphatic or alicyclic dicarboxylic acid. It is preferable to have a polyester copolymerized with 0.5 to 20 mole % of a dicarboxylic acid having a polymerizable unsaturated double bonds for the total carboxylic acid components and/or 0.5 to 20 mole % of a diol having polymerizable unsaturated double bonds for the total diol components. The aromatic carboxylic acids include terephthalic acid, isophthalic acid, orthophthalic acid, naphthalene dicarboxylic acids, diphenyl dicarboxylic acids, and the like.

The aliphatic dicarboxylic acids include succinic acid, adipic acid, azelaic acid, sebacic acid, lauric acid, dimer acids, and the like, and the alicyclic dicarboxylic acids include 1,4-cyclohexane dicarboxylic acids, 1,3-cyclohexane dicarboxylic acids, 1,2-cyclohexane dicarboxylic acids, and anhydrides thereof, and the like.

The dicarboxylic acids having a polymerizable unsaturated double bond include $\alpha,\beta$-unsaturated dicarboxylic acids such as fumaric acid, maleic acid, maleic anhydride, itaconic acid, citraconic acid, and the like; and alicyclic dicarboxylic acids contain a polymerizable unsaturated double bond, such as 2,5-norbornene dicarboxylic anhydride, tetrahydro phthalic anhydride, and the like. Most preferred are fumaric acid, maleic acid, itaconic acid, and 2,5-norbornene dicarboxylic anhydride.

Moreover, hydroxy carboxylic acids such as p-hydroxy benzoic acid, p-(2-hydroxyethoxy) benzoic acid, hydroxy pivalic acid, $\gamma$-butyrolactone, $\epsilon$-caprolactone, and the like may optionally be used.

On the other hand, the diol component consists of an aliphatic diol having a carbon number of 2 to 10, and/or an alicyclic diol having a carbon number of 6 to 12 and/or an ether bond-containing diol. The aliphatic diols having a carbon number of 2 to 10 include ethylene glycol, 1,2-propylene glycol, 1,3-propane diol, 1,4-butane diol, 1,5-pentane diol, neopentyl glycol, 1,6-hexane diol, 3-methyl-1,5-pentane diol, 1,9-nonane diol, 2-ethyl-2-butylpropane diol, neopentyl glycol ester of hydroxy pivalic acid, and the like, and the alicyclic diols having a carbon number of 6 to 12 include 1,4-cyclohexane dimethanol, tricyclodecane dimethylol, and the like.

The ether bond-containing diols include diethylene glycol, triethylene glycol, dipropylene glycol, and further glycols obtained by adding 1 to several moles of ethylene oxide or propylene oxide to two phenolic hydroxyl groups of bisphenols, for example, 2,2-bis(4-hydroxyethoxyphenyl) propane, and the like. Also, polyethylene glycol, polypropylene glycol, polytetramethylene glycols may optionally be employed.

The polyester that can be used in the present invention, in the case of using as the dicarboxylic acid component 0.5 to 20 mole % of a dicarboxylic acid having polymerizable unsaturated double bonds for the total acid components, contains 60 to 99.5 mole %, and preferably 70 to 99 mole % of an aromatic dicarboxylic acid; and 0 to 40 mole %, and preferably 0 to 30 mole % of an aliphatic dicarboxylic acid and/or an alicyclic dicarboxylic acid. If the amount of the aromatic dicarboxylic acid is less than 60 mole %, the workability, and swelling resistance and blister resistance after the retort treatment of the coating film obtained from the resin is reduced. If the amount of the aliphatic dicarboxylic acid and/or alicyclic dicarboxylic acid exceeds 40 mole %, not only the hardness, contamination resistance, and retort resistance of the coating film is reduced, but troubles may occur such as the polymerization degree of the polyester during the storage is reduced, because the aliphatic ester bond has a lower resistance against hydrolysis, compared to the aromatic ester bond.

The amount of the dicarboxylic acid having a polymerizable unsaturated double bond is desirably 0.5 to 20 mole %, more desirably 1 to 12 mole %, and most desirably 1 to 9 mole % for the total acid components. When the amount of the dicarboxylic acid having a polymerizable unsaturated double bond is less than 0.5 mole %, the radical polymerizable monomer is not effectively grafted into the polyester so that a homopolymer consisting of only the polymerizable monomer is produced. In such a case, the desired modified resin cannot be obtained.

When the amount of the dicarboxylic acid having a polymerizable unsaturated double bond exceeds 20 mole %, various properties of the base resin itself are largely reduced. Also, viscosity of the reacting polymer in the latter period of the grafting reaction substantially increases. Therefore, the polymer is undesirably entangled with the stirrer, preventing the reaction from proceeding uniformly.

The diols having polymerizable unsaturated double bonds include glycerin monoallyl ether, trimethylolpropane monoallyl ether, pentaerythritol monoallyl ether, and the like.

When a diol having polymerizable unsaturated double bonds is used, the amount of the diol is desirably 0.5 to 20 mole %, more desirably 1 to 12 mole %, and most desirably 1 to 9 mole %. When the amount of the diol having polymerizable unsaturated double bonds is less than 0.5 mole %, the radical polymerizable monomer is not effectively grafted into the polyester resin, so that a homopolymer consisting of only the radical polymerizable monomer is produced, and therefore the desired modified resin cannot be obtained.

The sum of the diol and dicarboxylic acid having a polymerizable unsaturated double bond is desirably up to 20 mole % for the total acid components and diol components. When the sum exceeds 20 mole %, various properties of the base resin itself are largely reduced. Also, viscosity of the reacting polymer in the latter period of the grafting reaction substantially increases. Therefore, the polymer is undesirably entangled with the stirrer, preventing the reaction from proceeding uniformly.

Preferably, 0 to 5 mole % of trifunctional or more polycarboxylic acid and/or polyol may be copolymerized with the dicarboxylic acid and/or glycol in the polyester used in the present invention. The trifunctional or more polycarboxylic acids include trimellitic acid (anhydride), pyromellitic acid (anhydride), benzophenone tetracarboxylic acid (anhydride), trimesic acid, ethylene glycol bis (anhydrotrimellitate), glycerol tris(anhydrotrimellitate), and the like. The trifunctional or more polyols include glycerin, trimethylolethane, trimethylolpropane, pentaerythritol, and the like. The trifunctional or more polycarboxylic acid and/or polyol may be copolymerized with the dicarboxylic acid and/or diol in an amount ranging desirably from 0 to 5 mole %, and more desirably from 0.5 to 3 mole % for the total acid components and/or the total diol components. When the amount exceeds 5 mole %, the resulting polyester does not have sufficient workability.

The polyester that can be used in the present invention has a weight average molecular weight ranging desirably from 5000 to 100000, more desirably from 7000 to 70000, and most desirably from 10000 to 50000. When the weight average molecular weight of the polyester is less than 5000, various properties of the polyester resin are reduced. When the weight average molecular weight is more than 100000, the viscosity of the polyester is increased in the course of the grafting reaction, thereby preventing the the reaction proceeding uniformly.

Polyester Polyurethanes

The polyester polyurethane used in the present invention comprises (a) a polyester polyol, (b) an organic diisocyanate compound, and optionally (c) a chain extender having an active hydrogen group , and may have. a weight average molecular weight of 5000 to 100000, an urethane bond content of 500 to 4000 equivalents/$10^6$ g, and on average 1.5 to 30 of polymerizable unsaturated double bonds for one molecule of the polyester polyurethane.

The polyester polyols (a) that can be used in the present invention are desirably those prepared using the compounds already illustrated in the chapter of the polyester such as the dicarboxylic acid component and the diol component, and having hydroxyl groups at both molecular terminals and a weight average molecular weight of 500 to 10000.

Similar to the polyester, the polyester polyol that can be used in the present invention contains at least 60 mole %, and desirably 70 mole % or more of an aromatic dicarboxylic acid component.

The polyurethanes using an aliphatic polyester polyol which is widely used for the general polyurethane resins, for example, adipates of ethylene glycol and neopentyl glycol have extremely low water resistance. For example, when the polyurethane is immersed into a hot water of 70° C. for 20 days, its retaining percentage of the reduced viscosity is as low as 20 to 30%. On the other hand, the retaining percentage of the reduced viscosity of a polyester polyol comprising terephthalate or isophthalate of the same glycol is as high as 80 to 90%. Therefore, it is necessary to use the polyester polyol comprising mainly an aromatic carboxylic acid for the high water resistance of the coating film obtained from the polyester polyol.

Also, polyether polyols, polycarbonate diols, polyolefin polyols, and the like may optionally be used together with these polyester polyols.

The diisocyanates (b) that can be used in the present invention include hexamethylene diisocyanate, tetramethylene diisocyanate, 3,3'-dimethoxy-4,4'-biphenylene diisocyanate, p-xylilene diisocyanate, m-xylilene diisocyanate, 1,3-diisocyanate methyl cyclohexane, 4,4'-diisocyanate dicyclohexane, 4,4'-diisocyanate cyclohexylmethane, isophorone diisocyanate, 2,4-tolylene diisocyanate, 2,6-tolylene diisocyanate, p-phenylene diisocyanate, diphenylmethane diisocyanate, m-phenylene diisocyanate, 2,4-naphthalene diisocyanate, 3,3'-dimethyl-4,4'-biphenylene diisocyanate, 4,4'-diisocyanate diphenylether, 1,5-naphthalene diisocyanate, and the like.

The chain extenders (c), have an active hydrogen group, that may optionally be used in the present invention and include, for example, glycols such as ethylene glycol, propylene glycol, neopentyl glycol, 2,2-diethyl-1,3-propane diol, diethylene glycol, spiro glycol, polyethylene glycol, polycaprolactone diol, poly(β-methyl-δ-valerolactone) diol, and the like; and amines such as hexamethylene diamine, propylene diamine, ethylene diamine, and the like.

It is preferred that the polyurethane used in the present invention be a polyurethane obtained by reacting the polyester polyol (a), the organic diisocyanate (b), and optionally the chain extender (c) having an active hydrogen in a blending ratio of [the active hydrogen groups of (a) and (c)]/[the isocyanate groups of (b)] ranging from 0.4 to 1.3 (equivalent ratio).

When the ratio of [the active hydrogen groups of (a) and (c)]/[the isocyanate groups of (b)] is outside of of the range, a polyurethane having sufficiently high molecular weight cannot be obtained, which makes it virtually impossible to provide the coating film having desired properties.

The polyurethane used in the present invention is prepared by well known procedures in the presence or absence of a catalyst at a reaction temperature of 20° to 150° C. in a solvent. The solvents used in this case include, for example, ketones such as methyl ethyl ketone, methyl isobutyl ketone, cyclohexanone, and the like; aromatic hydrocarbons such as toluene, xylene, and the like; and esters such as ethyl acetate, butyl acetate, and the like. The catalysts which accelerate the reaction include amines, organic tin compounds, and the like.

It is preferred that the polyurethane resin used in the present invention has on average polymerizable unsaturated double bonds of 1.5 to 30, desirably 2 to 20, and more desirably 3 to 15 for one molecule of the polyurethane in order to increase the efficiency of the grafting reaction.

The following three methods are available for the introduction of the polymerizable unsaturated double bonds into the main chain. These methods may be practiced alone or may be combined:

(1) The incorporation of an unsaturated dicarboxylic acid such as fumaric acid, itaconic acid, norbornene dicarboxylic acid, etc., into the polyester polyol;

(2) The incorporation of an allyl ether group-containing glycol into the polyester polyol; and (3) The use of an allyl ether group-containing glycol as the chain extender.

The polymerizable unsaturated double bonds introduced into the main chain of the polyester polyol by using the method (1), has a strong electron accepting property represented by an e value of 0.9 or more, while the polymerizable unsaturated double bonds introduced into the main chain by using the methods (2) and (3), has a strong electron donative property represented by an e value of −0.6 or less.

The gist of the present invention is to provide the base resin (i.e. the polymer that constitutes the main chain) and the radical polymerizable monomers for the grafting reaction, in consideration of the intensity and amount of the electron accepting property or electron donative property of the polymerizable unsaturated double bonds introduced into the base resin, as well as the combinations and combination ratios of the electron accepting monomer and the electron donative monomer.

According to the conventionally established theory regarding the formation of a graft or block polymer, only one polymerizable unsaturated double bond is present in the main chain or at its terminal. Actually, much of the prior art describes methods using the base resin having an extremely narrow scope of polymerizable unsaturated double bonds. In other words, these prior art describe methods using the base resin having only about one polymerizable unsaturated double bond. According to the methods described in the prior art, the number of polymerizable double unsaturated bonds introduced into the main chain is calculated based on the statistical distribution. Therefore, as the percentage of the chain components having no polymerizable unsaturated double bond for one main chain is increased, the graft efficiency of the polymer is reduced. In addition, when the amount of the double bond is increased, the polymer causes the gelation. Therefore, the range in which these methods are applicable is extremely narrow. On the other hand, according to the present invention which is based on the combination of the electron accepting monomer and the electron donative monomer, the grafting reaction product having a high graft efficiency and no gelation can be obtained.

Radical Polymerizable Monomers

The electron accepting monomer which is necessarily used in the present invention is a monomer having an electron attractive substituent in the unsaturated band, and is at least one selected from the group consisting of fumaric acid, monoesters and diesters of fumaric acid, such as monoethyl fumarate, diethyl fumarate, dibutyl fumarate, and the like, maleic acid and its anhydride, monoesters and diesters of maleic acid such as monoethyl maleate, diethyl maleate, dibutyl maleate, and the like, itaconic acid, monoesters and diesters of itaconic acid, maleimides such as phenyl maleimide, and acrylonitrile. Maleic-anhydride and its esters, fumaric acid and its esters are the most preferred.

The electron donative monomer which is necessarily used in the present invention is a monomer having an electron donative substituent in the unsaturated bond or a conjugated monomer, and is at least one selected from the group consisting of vinyl type radical polymerizable monomers such as styrene, alpha-methyl styrene, t-butyl styrene, N-vinyl pyrrolidone, and the like, vinyl esters such as vinyl acetate, vinyl ethers such as vinyl butyl ether, vinyl isobutyl ether, and the like, allyl type radical polymerizable monomers such as allyl alcohol, glycerin monoallyl ether, pentaerythritol monoallyl ether, trimethylol propane monoallyl ether, and the like, and butadiene, and the like. The vinyl type radical polymerizable monomers such as styrene are the most preferred.

The combination of the electron accepting monomer (A) having an e value of 0.9 or more and the electron donative monomer (B) having an e value of −0.6 or less is essential to the present invention. It is preferred that the combination of these monomers be contained in the total radical polymerizable monomers at least 30% by weight, desirably at least 50% by weight, and more desirably 60% by weight or more. Also, it is preferred that 20% by weight or more of a highly copolymerizable radical polymerizable monomer (i.e., the monomer having an e value largely different from the e value of the unsaturated bond in the resin to be modified) among these two types of the radical polymerizable monomers be contained in the total radical polymerizable monomers, while 20% by weight or more of a less copolymerizable radical polymerizable monomer (i.e., the monomer having an e value not largely different from the e value of the unsaturated bond in the resin to be modified) among these two types of the radical polymerizable monomers be contained in the total radical polymerizable monomers. When the amount of the former is less than 20% by weight, the grafting efficiency of the main chain is not sufficient, which may cause the homopolymerization of the radical polymerizable monomers. When the amount of the latter is less than 20% by weight, the gelation may occur during the graft polymerization, which prevents the smooth grafting reaction.

Also, other radical polymerizable monomers (C) which may optionally be copolymerizable with the above-described essential components include those having an e value of −0.6 to 0.9. These monomers are one or more selected from the group consisting of, for example, monomers containing one radical polymerizable unsaturated double bond for one molecule of the monomer, including acrylic acid, methacrylic acid, and esters thereof such as ethyl acrylate, methyl methacrylate, and the like, an nitrogen-containing radical polymerizable monomers such as acrylamide, methacrylonitrile and the like. Thus, it is possible to control the Tg value of the side chain or the compatibility with the main chain, and also to introduce optional functional groups into the essential components.

Also, the aromatic radical polymerizable monomers which are essential in the side chain include radical polymerizable monomers having an aromatic ring. The aromatic ring can be introduced into the side chain by using styrene derivatives such as styrene, alpha-methyl styrene, chloro methyl styrene, and the like; reaction products of aromatic compounds with 2-hydroxyethyl acrylate (HEA) and 2-hydroxyethyl methacrylate (HEMA), such as phenoxy ethyl acrylate, phenoxy ethyl methacrylate, benzyl acrylate, benzyl methacylate, and the like; esters of HEA or HEMA and phthalic acid derivatives such as 2-acryloyloxyethyl hydrogen phthalate, and the like; reaction products of acrylic acid, methacrylic acid, and the like with a phenyl glycidyl ether, i.e., 2-hydroxy-3-phenoxypropyl (meth)acrylate, and the like. The amount of the aromatic radical polymerizable monomer used in the present invention is at least 10% by weight, desirably 20% by weight or more, and most desirably 30% by weight or more for the total radical polymerizable monomers.

Grafting Reaction

The grafting reaction product of the present invention can be obtained by the graft polymerization of the polymerizable unsaturated double bond existing in the base resin (i.e. the main chain) with the radical polymerizable monomers. The graft polymerization reaction in the present invention is performed by reacting the base resin which is dissolved in an organic solvent with a mixture of the radical polymerizable monomers and a radical initiator.

After the termination of the grafting reaction, the reaction product may comprise not only the graft polymer, but the base resin which is not grafted, and the homopolymer of the monomers which is not grafted into the base resin. In general, when the reaction product contains a low percentage of the graft polymer, and a high percentage of the non-grafted base resin and the non-grafted homopolymer, it shows little effect of the modification, and also adverse effects are observed that the resultant coating film becomes white due to the presence of the non-grafted homopolymer. Therefore, it is important to select the reaction conditions which provide a high percentage of the graft polymer.

In the practice of the grafting reaction of the radical polymerizable monomers into the base resin, the radical polymerizable monomers and the radical initiator may be simultaneously added to the base resin which is dissolved in a solvent under the heating condition to proceed the reaction, or they may be separately added dropwise to the base resin and heated continuously while stirring for a certain period of time to proceed the reaction. Also, one of the preferred embodiments of the present invention includes previously adding the radical polymerizable monomer having an, e value not largely different from the e value of the polymerizable unsaturated double bond of the base resin to the base resin, and then adding dropwise the radical polymerizable monomer having an e value largely different from the e value of the polymerizable unsaturated double bond of the base resin, and the initiator to the base resin for a certain period of time, and further heating the mixture while stirring for a certain period of time to proceed the reaction.

Prior to the reaction, a reactor is charged with the base resin and the solvent, and heated while stirring to dissolve the resin. It is desirable that the percentage by weight of the base resin to the solvent be in the range of from 70/30 to 30/70. In this case, the percentage by weight is adjusted to a value such that the reaction is uniformly conducted in the course of the polymerization, in consideration of the reactivity and solubility of the base resin and the radical polymerizable monomer. It is desirable that the grafting reaction temperature be in the range of from 50° to 120° C.

The desirable percentage by weight of the base resin to the radical polymerizable monomers which is suitable for the purpose of this invention is in the range of from 25/75 to 99/1 (the base resin/the side chain), and more desirably in the range of from 50/50 to 95/5.

When the percentage by weight of the base resin is less than 25% by weight, the grafting reaction product does not sufficiently exhibit the excellent properties of the base resin which were previously explained, i.e., high workability, excellent water resistance, adhesiveness to various substrates. When the percentage by weight of the base resin is more than 99% by weight, because the grafting reaction product comprises mostly the base resin which is not grafted, a little effect of the modification is attained.

The weight average molecular weight of the grafted chain (i.e. side chain) of the grafting reaction product in the present invention is in the range of from 1000 to 100000. In the case of the graft polymerization by the radical reaction, it is generally difficult to control the weight average molecular weight of the grafted chain to less than 1000. When the weight average molecular weight of the grafted chain is less than 1000, the grafting efficiency is undesirably reduced, and the functional groups are not sufficiently added to the base resin. Also, when the weight average molecular weight of the grafted chain is more than 100000, the polymerization reaction cannot be performed in the desired uniform system due to the increased viscosity of the reaction system in the polymerization reaction. The control of the molecular weight which is herein explained can be made by suitably combining the amount of the initiator, the dropping time of the monomers, the polymerization time, the reaction solvent, the monomer composition, and optionally the chain transfer agent and polymerization inhibitor.

Radical Initiators

The radical initiators that can be used in the present invention include well known organic peroxides and organic azo compounds. The organic peroxides include benzoyl peroxide, t-butyl peroxy pivalate, and the like, and the organic azo compounds include 2,2'-azobisisobutyronitrile, 2,2'-azobis(2,4-dimethyl-valeronitrile), and the like.

It is desirable that the radical initiator be selected by considering the radical formation rate, i.e., half-life of the initiator at the reaction temperature. In general, it is desirable that a radical initiator having a half-life ranging from 1 minute to 2 hours be selected at the temperature. It is preferred that the amount of the radical initiator used for the grafting reaction be at least 0.2% by weight, and desirably 0.5% by weight or more for the radical polymerizable monomers.

A chain transfer agent such as octyl mercaptane, dodecyl mercaptane, mercapto ethanol, α-methyl styrene dimer, and the like may optionally be used so as to control the grafted chain length. In this case, it is desirable that the chain transfer agent be added in an amount ranging from 0 to 20% by weight for the radical polymerizable monomers.

Reaction Solvents

The reaction solvents that can be utilized include solvents widely used, including for example ketones such as methylethylketone, methylisobutylketone, cyclohexanone, and the like; aromatic hydrocarbons such as toluene, xylene, and the like; esters such as ethyl acetate, butyl acetate, and the like. However, the selection of the reaction solvent that is used for the grafting reaction is extremely important. The properties that the desirable reaction solvent should possess are (1) solubility, (2) suitability as a radical polymerization solvent, (3) a suitable boiling point, and (4) the miscibility of the solvent in water. As for (1), it is important that the solvent dissolve or disperse the base resin, and at the same time dissolve the side chain portions of the graft polymer, and the non-grafted homopolymer as well as possible. As for (2), it is important that the solvent itself neither decompose the radical initiator (induced decomposition) nor create a combination with the initiator which causes a danger of explosion that has been reported between specific organic peroxides and specific ketones. Furthermore, it is important that the solvent has a suitably lower chain transfer constant as a reaction solvent for the radical polymerization. As for (3), since the radical addition reaction is generally an exothermic reaction, it is desirable that the reaction be conducted under the reflux conditions of the solvent in order to maintain the reaction temperature at a constant level. As for (4), this condition is not itself an essential requirement for the grafting reaction, but in the case of introducing a hydrophilic functional group into the base resin by the modification for the purpose of making the modified resin dispersible in water, it is industrially desirable that the solvent selected under the conditions of (1)–(3) be an organic solvent which is freely miscible with water or highly soluble in water. When the solvent satisfies the fourth requirement, a water dispersion may be formed by directly adding water to the grafting reaction product containing the solvent while heating, and after neutralizing the product with a basic compound. Furthermore, it is desirable that the solvent which is freely miscible with water or highly soluble in water has a lower boiling point than the boiling point of water. In this case, it is possible to remove the organic solvent outside of the system by the simple distillation from the dispersion thus formed.

The grafting reaction solvents that can be used for the practice of the present invention include both single solvents and mixed solvents. Those having a boiling point exceeding 250° C. are not suitable because their evaporation speed is too slow to be sufficiently removed by the high temperature baking of the coating film obtained from the grafting reaction product. Also, those having a boiling point less than 50° C. require the use of an initiator cleaving into radicals at a temperature of less than 50° C. These initiators are not desirable due to the increased danger in handling.

When it is an objective to disperse the grafting reaction product thus produced into water, the reaction solvents that can be utilized for the grafting reaction include solvents which dissolve or disperse the base resin, and also dissolve the radical polymerizable monomers and their polymers relatively well. Examples include ketones such as methylethylketone, methylisobutylketone, cyclohexanone, and the like; cyclic ethers such as tetrahydrofuran, dioxane and the like; glycol ethers such as propylene glycol methylether, propylene glycol propylether, ethylene glycol ethylether, ethylene glycol butylether, and the like; carbitols such as methyl carbitol, ethyl carbitol, butyl carbitol, and the like; glycols and lower esters of glycol ethers such as ethylene glycol diacetate, ethylene glycol ethyl ether acetate, and the like; ketone alcohols such as diacetone alcohol, and the like; and N-substituted amides such as dimethylformamide, dimethylacetamide, N-methylpyrrolidone, and the like.

When the grafting reaction is conducted in a single solvent, the solvent may be selected from organic solvents which dissolve the base resin well. When the reaction is conducted in a mixed solvent, a plurality of solvents may be selected from the group consisting of the above-described organic solvents, and at least one of the above-described organic solvents which dissolve the base resin well and other organic solvents which hardly dissolve the base resin, such as lower alcohols, lower carboxylic acids, lower amines, and the like.

Utilization of the Grafting Reaction Product as a Solvent Soluble-Type Coating Agent The grafting reaction product of the present invention can be utilized as a solvent soluble-type coating agent. As illustrated in the examples, the properties of the coating film obtained from the grafting reaction product are largely improved by increasing the compatibility between the base resin and the grafted side chain. The present inventors have found that the mechanical properties of the coating film obtained from the grafting reaction product are practically the same as those of the base resin, because the reduction of the elongation is controlled, the reduction of the water resistance is hardly observed, and the compatibility between the base resin (i.e. the main chain) and the side chain is increased. On the other hand, the mechanical properties of the grafting reaction product obtained from the combination of the base resin and the side chain having poor compatibility therebetween are largely reduced in elongation at break, thereby reducing the workability of the coating film. It is confirmed that this principle is applicable for not only the heat dried coating film, but also the baked coating film in which a crosslinking agent is blended. Furthermore, this principle is applicable for the coating films of a water dispersion-type as well as a solvent soluble-type.

Also, it is observed that the blocking resistance of the heat dried coating film obtained from the grafting reaction product is improved, compared to that of the base resin, regardless of the composition of the side chain. When the base resin is a polyester or a polyester polyurethane containing an aromatic material, it is desirable that an aromatic radical polymerizable monomer be contained in the side chain to design a grafting reaction product having an increased compatibility between the main chain and the side chain in order to obtain a coating film having excellent mechanical properties and blocking resistance.

The compatibility between the main chain and the side chain is determined by synthesizing separately the main chain polymer and the side chain polymer dissolving each polymer in a common solvent to form a solution of each polymer, mixing both polymer solutions together, forming a coating film from the solution mixture by solvent casting, and observing the turbidity of the coating film. If a coating film has high transparency, the compatibility between the main chain and the side chain is determined to be good.

Although the Grafting reaction product of the present invention is utilized as such, it may be baked and cured as blending with a crosslinking agent to provide higher solvent resistance, water resistance and hardness, than those of the base resin. In this case, when the polyester or polyurethane is used as the base resin, only limited types of crosslinkable functional groups are introduced into the base resin due to the structure and reactivity of the base resin. Thus, the polyester or polyurethane was usually cross-linked only at its molecular terminal. As a result, increase in the crosslinking density of the base resin is limited. However, because any types of functional groups can be introduced into the side chain of the grafting reaction product of the present invention, regardless of the composition of the side chain, the crosslinking density of the product is largely increased, compared to the crosslinked base resin. This provides high solvent resistance, water resistance, hardness, and the like.

Utilization of the Grafting Reaction Product as a Water Dispersion-Type Coating Agent The grafting reaction product may be dispersed in water by neutralizing the hydrophilic functional group introduced by the grafting reaction with a basic compound. The ratio of the radical polymerizable monomers containing a hydrophilic functional group to those not containing such group depends on the types of the monomers, and the weight ratio of (the base resin to be grafted)/(the monomer forming the side chain) in the grafting reaction. The acid number of the grafting reaction product is desirably 200 to 4000 equivalent/$10^6$ g, and more desirably 500 to 4000 equivalent/$10^6$ g. The basic compounds are preferably those which are volatile at the time of forming the coating film or baking and curing the coating film with a curing agent. Ammonia and organic amines are preferred. The examples of the desirable compounds include triethylamine, N,N-diethylethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine, triethanolamine, and the like. It is desirable that the basic compound be used to neutralize the dispersion partially or completely, depending on the carboxyl group content contained in the grafting reaction product, so that the pH value of the water dispersion is in the range of from 5.0 to 9.0.

In the practice of dispersing the grafting reaction product in water, the grafting reaction product may be subjected to an extruder under reduced pressure to remove the solvent contained therein and to form a melt or solid (pellet, powder, etc.) grafting reaction product which is charged into the water containing a basic compound, and stirred while heating to form a water dispersion. More preferably, the basic compound and water are immediately charged into the grafting reaction product at the time that the grafting reaction is terminated, and then heated and stirred continuously to obtain the water dispersion (One Pot Method).

According to the latter method (i.e. One-Pot Method), the solvent miscible with the water which is used for the grafting reaction may partially or wholly be removed by the distillation or the azeotropic distillation with the water.

Formulations

The grafting reaction product of the present invention is utilized as vehicles for paints, inks, coating agents, adhesives, and the like; and as processing agents for fibers, films, paper products, and the like. Although the grafting reaction product of the present invention is used as such, it may be blended with a crosslinking agent and baked and cured to provide high solvent resistance, water resistance, and hardness. The crosslinking agents include phenol formaldehyde resins, amino resins, polyfunctional epoxy compounds, polyfunctional isocyanate compounds and various block isocyanate compounds thereof, and polyfunctional aziridine compounds, polyfunctional oxazoline compounds, and the like.

The phenol formaldehyde resins include formaldehyde condensates of alkylated phenols and cresols. Specifically, these include formaldehyde condensates of alkylated (methyl, ethyl, propyl, isopropyl, butyl) phenols, p-tert-amyl phenol, 4,4'-sec-butylidene phenol, p-tert-butyl phenol, o-, m- and p-cresol, p-cyclohexyl phenol, 4,4'-isopropylidene phenol, p-nonyl phenol, p-octyl phenol, 3-pentadecyl phenol, phenol, phenyl-o-cresol, p-phenyl phenol, xylenol, and the like.

The amino resins include for example formaldehyde adducts of urea, melamine, benzo guanamine, and the like, and alkylether compounds of these and alcohols having 1–6 carbon atoms. Specifically, these include methoxylated methylol urea, methoxylated methylol-N,N-ethylene urea, methoxylated methylol dicyandiamide, methoxylated methylol melamine, methoxylated methylol benzo guanamine, butoxylated methylol melamine, butoxylated methylol benzo guanamine, and the like. Methoxylated methylol melamine, butoxylated methylol melamine and methoxylated methylol benzo guanamine are preferred. These may be used alone or combined together.

The epoxy compounds include diglycidyl ether of bisphenol A and oligomers thereof, diglycidyl ether of hydrogenated bisphenol A and oligomers thereof, diglycidyl orthophthalate, diglycidyl isophthalate, diglycidyl terephthalate, diglycidyl p-oxybenzoate, diglycidyl tetrahydro-phthalate, diglycidyl hexahydrophthalate, diglycidyl succinate, diglycidyl adipate, diglycidyl sebacate, ethylene glycol diglycidyl ether, propylene glycol diglycidyl ether, 1,4-butane diol diglycidyl ether, 1,6-hexane diol diglycidyl ether, and polyalkylene glycol diglycidyl ethers, triglycidyl trimellitate, triglycidyl isocyanurate, 1,4-diglycidyloxy benzene, diglycidyl propylene urea, glycerol triglycidyl ether, trimethylolpropane glycidyl ether, pentaerythritol triglycidyl ether, triglycidyl ethers of glycerol alkylene oxide adducts, and the like.

Moreover, the isocyanate compounds include aromatic and aliphatic diisocyanates, and trihydric or more polyisocyanates, and may include both low molecular weight compounds and high molecular weight compounds. These include for example tetramethylene diisocyanate, hexamethylene diisocyanate, toluene diisocyanate, diphenylmethane diisocyanate, hydrogenated diphenylmethane diisocyanate, xylilene diisocyanate, hydrogenated xylilene diisocyanate, isophorone diisocyanate,and trimers of these isocyanate compounds, and terminal isocyanate group-containing compounds obtained by reacting an excess amount of these isocyanate compounds with low molecular weight active hydrogen compounds or high molecular weight active hydrogen compounds. The low molecular weight active hydrogen compounds include ethylene glycol, propylene glycol, trimethylolpropane, glycerin, Sorbitol, ethylene diamine, monoethanolamine, diethanol amine, triethanol amine, and the like. The high molecular weight active hydrogen compounds include various polyester polyols, polyether polyols, polyamides, and the like.

The isocyanate compound may be a blocked isocyanate. The blocking agents for the isocyanate include for example phenols such as phenol, thiophenol, methyl thiophenol, cresol, xylenol, resorcinol, nitrophenol, chlorophenol, and the like; oximes such as acetoxime, methylethyl ketoxime, cyclohexanone oxime, and the like; alcohols such as methanol, ethanol, propanol, butanol, and the like; halogen-substituted alcohols such as ethylene chlorohydrine, 1,3-dichloro-2-propanol, and the like; tertiary alcohols such as t-butanol, t-pentanol, and the like; lactams such as ε-caprolactam, δ-valerolactam, γ-butyrolactam, β-propyrolactam, and the like; and further aromatic amines; imides; active methylene compounds such as acetyl acetone, acetoacetates, ethyl malonate, and the like; mercaptanes; imines; ureas; diaryl compounds; sodium bisulfite; and the like. The blocked isocyanate is obtained by addition reaction of the above-described isocyanate with the blocking agent for the isocyanate according to the conventional procedure.

A curing agent or accelerator may be used in combination with the crosslinking agent. The crosslinking agent may be blended with the base resin, or dissolved previously in the organic solvent of the grafting reaction product to form a mixed solution and dispersing the mixed solution in water, depending on the types of the crosslinking agent.

The curing reaction is generally made by blending 5 to 40 parts (solid content) of the curing agent with 100 parts (solid content) of the grafting reaction product, and heating the blend at a temperature ranging from 60° to 250° C. for 1 to 60 minutes, depending on the types of the curing agent. Optionally, a reaction catalyst and accelerator may be used in combination. If necessary, pigments, dyes, various additives and the like may be blended with the grafting reaction product of the present invention. The grafting reaction product of the present invention may be mixed with other resins to improve its workability.

The paints, inks, coating agents, adhesives and various processing agents containing the grafting reaction products of the present invention are possibly applicable for any of the dip coating method, brushing method, roll coating method, spraying method, and various printing methods.

EXAMPLES

The present invention is illustrated by the following examples in more detail, but should not be interpreted as being limited to these.

In the examples, parts and % indicate parts by weight and % by weight, respectively. Each measurement was made by the following method.

(1) The Weight Average Molecular Weight of the Resins:

The weight average molecular weight of the resin was measured by dissolving 0.005 g of the resin in 10 cc of tetrahydrofuran, and subjecting the solution to the GPC-LALLS low angle light scattering photometer LS-8000 (manufactured by Toso, Inc.; tetrahydrofuran solvent; polystyrene standard).

(2) The Glass Transition Temperature (Tg) of the Resins:

The glass transition temperature (Tg) was measured using a differential scanning calorimeter (DSC) at an increasing temperature rate of 20° C./min. The test sample was prepared by charging 5 mg of the resin into an aluminum container, and covering the top of the container.

(3) The Weight Average Molecular Weight of the Grafted Side Chain:

The graft reaction product (i.e. graft copolymer) was hydrolyzed in a KOH/water-methanol solution under reflux condition. The hydrolyzed product was extracted under acidic condition by using THF, and reprecipitated with hexane to purify the polymer which had formed the side chains. The polymer is measured by a GPC apparatus (manufactured by Shimazu Seisakusho, Inc.; tetrahydrofuran solvent; polystyrene standard) to calculate the weight average molecular weight of the grafted side chain.

(4) The Particle Size of the Dispersion:

The dispersion was prepared having a solid concentration of 0.1% by weight by using an ion exchange water, and measured by a laser beam light scattering particle size distribution meter, Coulter model N4 (manufactured by Coulter, Inc.) at 20° C.

(5) The Brookfield Viscosity of the Dispersion:

The viscosity of the dispersion was measured at 25° C. by using a rotation viscometer (manufactured by Tokyo Keiki, Inc.; EM type).

(6) The Reduced Viscosity of the Graft Polyester:

The reduced viscosity was measured at 30° C. by dissolving 0.01 g of the graft polyester in 25 cc of the mixed solvent of phenol/tetrachloroethane (weight ratio; 6/4).

(7) The Hardness of the Cured Coating Film (Pencil Hardness):

The hardness was measured by using a high quality pencil defined by JIS S-6006, according to JIS K-5400.

(8) The Gloss of the Cured Coating Film:

The gloss was determined by measuring the reflectivity of the film at a reflection angle of 60 degrees.

(9) The Flexibility of the Cured Coating Film:

The flexibility was determined by bending the steel plate, which had been coated with the films containing the grafting reaction product, at an angle of 180 degrees and observing the cracks generated in the bent portion with a 10-fold loupe. The symbol, 4T, indicates that no cracks occur in the bent portion even when four steel plates having the same thickness as that of the coated steel plate are inserted into the bent portion.

(10) The Adhesiveness of the Cured Coating Film:

The adhesiveness was measured according to ASTM D-3359.

(11) The Solvent Resistance of the Cured Coating Film:

When the coating film was rubbed with a gauze impregnated with xylene, the number of rubbings until the base appeared was recorded.

(12) The Water Resistance of the Cured Coating Film:

To 100 parts (solid) of the grafting reaction product, 25 parts (solid) of a melamine resin, 0.25 part (solid) of para-toluene sulfonic acid (catalyst), 100 parts of titanium oxide, and 250 parts of glass beads were blended, and dispersed by shaking in a paint shaker for 5 hours. Then, the dispersion was applied to a galvanized iron plate so that the dried coating film had a thickness of 15 μm, and baked at 230° C. for 1 minute. The resulting coated plate was treated in boiling water for 2 hours, and evaluated in its gloss retaining percentage (%). The gloss retaining percentage was calculated by the following formula:

---

The gloss retaining percentage (%) =
(the gloss after the treatment/the gloss before the treatment) × 100

---

(13) The Grafting Efficiency of the Grafting Reaction Product:

The grafting reaction product was measured by 220 MHz $^1$H NMR and 55 MHz $^{13}$C NMR (manufactured by Bariane, Inc.; measurement solvent, CDCl$_3$/DMSO-d6) to calculate the grafting efficiency based on the variation of the intensity of the signal derived from the double bond of the double bond-containing components copolymerized with the polyester.

---

The grafting efficiency of the polyester =
(1 − (the relative intensity of the signal derived from the double bond of the double bond-containing components of the grafting reaction product/the relative intensity of the signal derived from the double bond of the double bond-containing components of the starting polyester)) × 100 (%)

---

Additionally, the relative intensity was calculated in comparison with the intensity of the signal of the internal standard as a standard signal.

(14) The Evaluation of the Compatibility Between the Main Chain and the Side Chain:

The resins forming the main chain and side chain of the grafting reaction product were separately synthesized, dissolved in tetrahydrofuran to form transparent tetrahydrofuran solutions having a solid concentration of 5%, and mixed together at a solid ratio by weight of 50/50. The mixture was applied to a glass so that the dried coating film had a thickness of 100 μm, and was dried at 120° C. for 10 minutes to obtain a coating film. The transparency of the coating film was visually observed.

○; The coating film had high transparency.
Δ; The coating film was turbid.
X; The coating film was white.

Preparation Examples of the Polyester Resin

To a stainless steel autoclave equipped with a stirrer, a thermometer and a partial reflux type condenser, 466 parts of dimethyl terephthalate, 466 parts of dimethyl isophthalate, 401 parts of neopentyl glycol, 443 parts of ethylene glycol, and 0.52 part of tetra-n-butyl titanate were charged to conduct the transesterification reaction at 160° C. to 220° C. for 4 hours. Then, 23 parts of fumaric acid were added to the autoclave, and heated from 200° C. to 220° C. over 1 hour to conduct the esterification reaction. Then, after heating the autoclave to 255° C. and gradually reducing the pressure of the reaction system, the reaction mixture was reacted under a reduced pressure of 0.2 mmHg for 1 hour and 30 minutes to obtain the polyester (A-1). The resulting polyester (A-1) was transparent and light yellow. The composition of the polyester (A) was as follows, according to the NMR, etc.

| The dicarboxylic acid components: | |
|---|---|
| terephthalic acid; | 47 mole % |
| isophthalic acid; | 48 mole % |
| fumaric acid; | 5 mole % |
| The diol components: | |
| neopentyl glycol; | 50 mole % |
| ethylene glycol; | 50 mole % |

Various polyesters (A-2 to A-4) illustrated in Table 1 were prepared by the same procedure as that of A-1.

Table 1 shows the molecular weight and composition of each polyester measured by NMR, etc.

TABLE 1

| Polyester | A-1 | A-2 | A-3 | A-4 | A-5 | A-7 |
|---|---|---|---|---|---|---|
| Contents (mole %) Dicarboxylic | | | | | | |
| T | 47 | 50 | 48 | 50 | 47 | 50 |
| I | 46 | 49 | 47 | 16 | 48 | 50 |
| SA | 0 | 0 | 0 | 29 | 0 | 0 |
| F | 7 | 1 | 5 | 5 | 5 | 0 |
| Diol | | | | | | |
| EG | 50 | 50 | 0 | 55 | 50 | 50 |
| NPG | 50 | 50 | 0 | 45 | 50 | 50 |
| MPD | 0 | 0 | 100 | 0 | 0 | 0 |
| Reduced viscosity | 0.55 | 0.50 | 0.62 | 0.72 | 0.30 | 0.30 |

T; terephthalic acid, I; isophthalic acid, SA; sebacic acid, F; fumaric acid, EG; ethylene glycol, NPG; neopentyl glycol, MPD; 3-methyl-1,5-pentanediol Preparation Examples of the Polyester Polyurethane Resins To a stainless steel autoclave equipped with a stirrer, a thermometer and a partial reflux type condenser, 466 parts of dimethyl terephthalate, 466 parts of dimethyl isophthalate, 401 parts of neopentyl glycol, 443 parts of ethylene glycol, and 0.52 part of tetra-n-butyl titanate were charged to conduct the transesterification reaction at 160° C. to 220° C. for 4 hours. Then, 23 parts of fumaric acid were added to the autoclave, and heated from 200° C. to 220° C. over 1 hour to conduct the esterification reaction. Then, after heating the autoclave to 255° C. and reducing gradually the pressure of the reaction system, the reaction mixture was reacted under a reduced pressure of 0.3 mmHg for 1 hour to obtain the polyester (A-5). The resulting polyester (A-5) was transparent and light yellow. The composition of the polyester (A) was as follows, according to the NMR, etc.

| The dicarboxylic acid components: | |
|---|---|
| terephthalic acid; | 47 mole % |
| isophthalic acid; | 48 mole % |
| fumaric acid; | 5 mole % |
| The diol components: | |
| neopentyl glycol; | 50 mole % |
| ethylene glycol; | 50 mole % |

Then, 100 parts of the polyester (A-5) and 100 parts of methylethylketone were charged into a reactor equipped with a stirrer, a thermometer and a partial reflux type condenser, and dissolved. To the solution, 3 parts of neopentyl glycol, 15 parts of diphenylmethane diisocyanate and 0.02 part of dibutyl tin laurate were charged and reacted at 60° to 70° C. for 6 hours. Then, 1 part of dibutylamine was added to the reactor, and cooled to room temperature to terminate the reaction. The reduced viscosity of the polyurethane (A-6) was 0.52.

The polyester (A-7) and polyester polyurethane (A-8) shown in Tables 1 and 2 were prepared by the same procedure. Tables 1 and 2 show the molecular weights and compositions of each polyester and polyester polyurethane measured by NMR, etc., respectively.

TABLE 2

| Polyester polyurethane | A-6 | A-8 |
|---|---|---|
| Contents (parts by weight) | | |
| Polyester | A-5 | A-7 |
|  | 100 | 100 |
| GMAE | 0 | 3 |
| NPG | 3 | 0 |
| MDI | 20 | 0 |
| IPDI | 0 | 20 |
| Reduced viscosity | 0.52 | 0.55 |

GMAE; glycerin monoallylether, NPG; neopentyl glycol, MDI; diphenylmethane diisocyanate, IPDI; isophorone diisocyanate Example 1

To a reactor equipped with a stirrer, a thermometer, a reflux device and a quantitative dropping device, 60 parts of the polyester (A-1), 70 parts of methyl ethyl ketone, 20 parts of isopropyl alcohol, 6.4 parts of maleic anhydride, and 5.6 parts of diethyl fumarate were charged. The mixture was heated and stirred to dissolve the polyester under reflux condition. After dissolving the polyester completely, a mixture of 8 parts of styrene and 1 part of octyl mercaptane, and a solution of 1.2 parts of azobisisobutyronitrile in a mixed solvent of 25 parts of methylethylketone and 5 parts of isopropyl alcohol were added dropwise to the polyester solution over 1.5 hours. The reaction mixture was further reacted for 3 hours to obtain the solution of the grafting reaction product (B-1). The grafting efficiency of the grafting reaction product was 60%. Also, the molecular weight of the side chain of the grafting reaction product was 8000. To the solution of the grafting reaction product (B-1), 20 parts of ethanol were added to react with the maleic anhydride in the side chain of the grafting reaction product for 30 minutes under reflux condition, and cooled to room temperature. Then, 10 parts of triethylamine were added to neutralize the reaction product. 160 parts of an ion exchange water were added to the neutralized mixture, and stirred for 30 minutes. Thereafter, the remaining solvents were distilled by heating to obtain the dispersion (C-1). The dispersion (C-1) was milk white, having an average particle size of 80 nm and a Brookfield viscosity of 50 cps. at 25° C. When the dispersion was allowed to stand at 40° C. for 60 days, no appearance change and viscosity change were observed, indicating that the dispersion had excellent storage stability. The dispersion was applied to the non-treated surface of an OPP film, and dried at 120° C. for 2 hours to obtain a coating film having a thickness of 50 μm and containing no curing agent.

Table 3, Table 5, and Tables 6, 7 and 8 show the composition and properties of the grafting reaction product (B-1), the composition and properties of the dispersion (C-1), and the coating properties of the dispersion (C-1), respectively.

Example 2

To a reactor equipped with a stirrer, a thermometer, a reflux device and a quantitative dropping device, 90 parts of the polyester (A-1), 50 parts of cyclohexanone, 40 parts of an organic solvent consisting mainly of aromatic hydrocarbons (manufactured by Esso corporation; Solvesso 150), 4 parts of maleic anhydride, and 3 parts of diethyl fumarate were charged. The mixture was heated and stirred to dissolve the polyester at 80° C. After dissolving the polyester completely, a mixture of 3 parts of styrene and 0.1 part of octyl mercaptane, and a solution of 0.6 part of azobisisobutyronitrile in 10 parts of cyclohexanone were added dropwise to the polyester solution over 1.5 hours. The reaction mixture was further reacted for 3 hours, and thereafter adjusted to a solution having a solid content of 20% to obtain the solution of the grafting reaction product (B-2). The solution of the grafting reaction product was applied to the non-treated surface of an OPP film, and dried at 120° C. for 2 hours to obtain a coating film having a thickness of 50 μm and containing no curing agent. Table 3 and Table 5 show the composition and properties of the grafting reaction product (B-2), and the coating properties of the grafting reaction product (B-2), respectively.

Examples 3, 4 and 11

The polyesters (A-1 and A-2) of Table 1 and the polyester polyurethane (A-6) of Table 2 were grafted by the same procedure as in Example 1, except that the composition shown in Table 3 was employed to obtain the solutions of the grafting reaction products (B-3, B-4 and B-15). The grafting reaction products (B-3, B-4 and B-15) were dispersed in an ion exchange water by the same procedure as in Example 1 to prepare the dispersions (C-3, C-4 and C-15) (Table 5). Tables 3 and 5, and Tables 6, 7 and 8 show the compositions and properties of the grafting reaction products (B-3 and B-4), the compositions and properties of the dispersions (C-3, C-4 and C-15), and the coating properties of the dispersions (C-3 and C-4).

Examples 5–8

The polyesters (A-3 and A-4) of Table 1 and the polyester polyurethanes (A-6 and A-8) were grafted according to the compositions shown in Table 3, and the solid content adjusted to 20% by the same procedure as in Example 2 to obtain the solutions of various grafting reaction products (B-5 to B-8) (Table 3). The solutions of the grafting reaction products were applied to the non-treated surface of an OPP film, and dried at 120° C. for 2 hours to obtain coating films having a thickness of 50 μm and containing no curing agent. Table 3, and Tables 6, 7 and 8 show the composition and properties of the grafting reaction products (B-5 to B-8), and the coating properties of the grafting reaction product (B-5 to B-8) respectively.

Comparative Example 1

To a reactor equipped with a stirrer, a thermometer, a reflux device and a quantitative dropping device, 75 parts of the polyester (A-1), 50 parts of cyclohexanone, and 40 parts of Solvesso 150 were charged. The mixture was heated and stirred to dissolve the polyester at 80° C. After dissolving the polyester completely, a mixture of 25 parts of acrylic acid and 0.5 part of octyl mercaptane, and a solution of 0.6 part of azobisisobutyronitrile in 10 parts of cyclohexanone were added dropwise to the polyester resin solution over 1.5 hours, and further reacted for 3 hours, and thereafter adjusted to a solution having a solid content of 20% to obtain the solution of the grafting reaction product (B-9) (Table 4). The grafting reaction product had a grafting efficiency of 20% and a molecular weight of 12000. The solution of the grafting reaction product was applied to the non-treated surface of an OPP film, and dried at 120° C. for 2 hours to obtain a coating film having a thickness of 50 μm and containing no curing agent. Table 4, and Tables 6 and 7 show the composition and properties of the grafting reaction product (B-9), and the coating properties of the grafting reaction product (B-9).

Comparative Examples 2–4, 9 and 10

The polyesters (A-2 to A-4) of Table 1 and the polyester polyurethane (A-6) of Table 2 were grafted by the same procedure employed in Example 1, except that the composition shown in Table 4 was employed to obtain the solutions of the grafting reaction products (B-10 to B-12, B-16 and B-17). The grafting reaction products (B-10 to B-12, B-16 and B-17) were dispersed in an ion exchange water by the same procedure as in Example 1 to prepare the dispersions (C-10 to C-12, C-17 and C-18) (Table 5). The solution of the grafting reaction product was applied to the non-treated surface of an OPP film, and dried at 120° C. for 2 hours to obtain a coating film having a thickness of 50 μm and containing no curing agent. Table 4, Table 5, and Tables 6 show the compositions and properties of the grafting reaction products (B-10 to B-12, B-16 and B-17), the compositions and properties of the water dispersions (C-10 to C-12, and C-18), and the coating properties of the water dispersions (C-10 to C-12) respectively.

Comparative Examples 5–6

The polyester polyurethanes (A-6 and A-8) were grafted according to the compositions shown in Table 4, and the solid content adjusted to 20% by the same procedure as in Example 2 to obtain the solutions of the grafting reaction products (B-13 and B-14) (Table 4). The solutions of the grafting reaction products were applied to the non-treated surface of an OPP film, and dried at 120° C. for 2 hours to obtain coating films having a thickness of 50 μm and containing no curing agent. Table 4, and Tables 6 and 7 show the composition and properties of the grafting reaction products (B-13 and B-14), and the coating properties of the grafting reaction product (B-13 and B-14) respectively.

Examples 9–10

To 100 parts (solid) of each of the dispersion (B-1) and the solution of the grafting reaction product (B-5), a blend of 25 parts (solid) of a melamine resin (Sumimal M40W; manufactured by Sumitomo Chemical Industries, Inc.), 125 parts of titanium oxide and 250 parts of glass beads was dispersed by shaking in a paint shaker for 5 hours. Then, the dispersion was applied to a galvanized iron plate so that the dried coating film had a thickness of 15 μm. The iron plate having the applied dispersion was baked at 230° C. for 1 minute to obtain the coating film. Table 9 shows the coating properties of the coating film.

Comparative Examples 7–8

To 100 parts (solid) of each of the solutions of the grafting reaction products (B-9) and (B-13), a blend of 25 parts (solid) of a melamine resin (Sumimal M40S; manufactured by Sumitomo Chemical Industries, Inc.), 125 parts of titanium oxide and 250 parts of glass beads was dispersed by shaking in a paint shaker for 5 hours. Then, the dispersion was applied to a galvanized iron plate so that the dried coating film had a thickness of 15 μm. The iron plate having the applied dispersion was baked at 230° C. for 1 minute to obtain the coating film. Table 9 shows the coating properties of the coating film.

TABLE 3

| Grafting reaction product | Example 1 B-1 | Example 2 B-2 | Example 3 B-3 | Example 4 B-4 | Example 5 B-5 | Example 6 B-6 | Example 7 B-7 | Example 8 B-8 | Example 11 B-15 |
|---|---|---|---|---|---|---|---|---|---|
| Contents (parts by weight) | | | | | | | | | |
| Base resin | A-1 | A-1 | A-1 | A-2 | A-3 | A-4 | A-6 | A-8 | A-6 |
|  | 75 | 90 | 65 | 75 | 75 | 75 | 75 | 75 | 75 |
| Monomer *1 | | | | | | | | | |
| St | 10 | 3 | 14 | 20 | 8 | 8 | 7 | 15 | 2.5 |
| EA | 0 | 0 | 0 | 0 | 7 | 5 | 0 | 0 | 17.5 |
| MMA | 0 | 0 | 0 | 0 | 0 | 2 | 0 | 3 | 0 |
| BZA | 0 | 0 | 0 | 0 | 0 | 0 | 3 | 0 | 0 |
| DEF | 7 | 3 | 7 | 0 | 0 | 0 | 7 | 0 | 0 |
| MAnh | 8 | 4 | 14 | 5 | 10 | 10 | 8 | 7 | 5 |
| AA | 0 | 0 | 0 | 0 | 0 | 0 | 0 | 0 | 0 |
| AIBN *2 | 1.5 | 0.6 | 3.0 | 1.5 | 1.5 | 1.5 | 1.5 | 1.5 | 1.5 |
| Characterisitics of the grafting reaction product | | | | | | | | | |
| Solid contents | 40 | 50 | 40 | 40 | 40 | 40 | 40 | 40 | 40 |
| Viscosity increase *3 | none | none | none | none | none | none | none | none | none |
| Compatibility between base resin and side chain | ○ | ○ | ○ | ○ | ○ | ○ | ○ | ○ | ○ |

*1 St; styrene, EA; ethyl acrylate, MMA; methyl methacrylate, BZA; benzyl acryalate, DEF; diethyl fumarate, MAnh; maleic anhydride, AA; acrylic acid,
*2 2,2'-azobisisobutyronitrile,
*3 The viscosity of each solution at the time of the graft polymerization

TABLE 4

| | Comparative Example 1 | Comparative Example 2 | Comparative Example 3 | Comparative Example 4 | Comparative Example 5 | Comparative Example 6 | Comparative Example 9 | Comparative Example 10 |
|---|---|---|---|---|---|---|---|---|
| Grafting reaction product | B-9 | B-10 | B-11 | B-12 | B-13 | B-14 | B-16 | B-17 |
| Contents (parts by weight) | | | | | | | | |
| Base resin | A-1 | A-2 | A-3 | A-4 | A-6 | A-8 | A-6 | A-6 |
|  | 75 | 75 | 75 | 75 | 75 | 75 | 75 | 75 |
| Monomer *1 | | | | | | | | |
| St | 0 | 0 | 20 | 10 | 0 | 0 | 2.5 | 1 |
| EA | 0 | 0 | 0 | 0 | 0 | 0 | 21 | 0 |
| MMA | 0 | 0 | 0 | 0 | 0 | 0 | 0 | 16.5 |
| MAnh | 0 | 0 | 0 | 0 | 0 | 0 | 1.5 | 7.5 |
| AA | 25 | 25 | 5 | 15 | 25 | 25 | 0 | 0 |
| AIBN *2 | 1.5 | 1.5 | 1.5 | 1.5 | 1.5 | 1.5 | 1.5 | 1.5 |
| Characterisitics of the grafting reaction product | | | | | | | | |
| Solid contents | 40 | 40 | 40 | 30 | 40 | 40 | 40 | 40 |
| Viscosity increase *3 | none | none | gelation | none | none | none | gelation | none |

TABLE 4-continued

|  | Comparative Example 1 | Comparative Example 2 | Comparative Example 3 | Comparative Example 4 | Comparative Example 5 | Comparative Example 6 | Comparative Example 9 | Comparative Example 10 |
| --- | --- | --- | --- | --- | --- | --- | --- | --- |
| Compatibility between base resin and side chain | × | × | ○ | × | × | × | ○ | Δ |

*1 St; sytrene, EA; ethyl acrylate, MMA; methyl methacrylate, MAnh; maleic anhydride, AA; acrylic acid,
*2 2,2'-azobisisobutyronitrile,
*3 The viscosity of each solution at the time of the graft polymerization

TABLE 5

|  | Example 1 | Example 3 | Example 4 | Example 11 | Comparative Example 2 | Comparative Example 3 | Comparative Example 4 | Comparative Example 10 |
| --- | --- | --- | --- | --- | --- | --- | --- | --- |
| Dispersion Contents (parts by weight) | C-1 | C-3 | C-4 | C-15 | C-10 | C-11 | C-12 | C-18 |
| Solution of the grafting reaction product | B-1 100 | B-3 100 | B-4 100 | B-15 100 | B-10 100 | B-11 100 | B-12 100 | B-17 100 |
| TEA *1 | 5 | 5 | 5 | 5 | 5 | 5 | 5 | 5 |
| Ion exchange water | 80 | 80 | 80 | 80 | 80 | 80 | 80 | 80 |
| Dispersibility *2 | ○ | ○ | ○ | Δ | × | ×× | × | × |

*1 triehtylamine
*2 dispersibility: ○; excellent, Δ; good, ×; no good, ××; not dispersed in water

TABLE 6

| Base resin | A-1 |  |  | A-2 | A-3 | A-4 | A-6 | A-8 |
| --- | --- | --- | --- | --- | --- | --- | --- | --- |
| T g (°C.) | 60 |  |  | 62 | 5 | 10 | 58 | 60 |
| Stress at break (kg/cm$^2$) | 600 |  |  | 500 | 1 | 40 | 520 | 500 |
| Elongation at break (%) | 3.0 |  |  | 3.0 | 2000 | 800 | 2.8 | 3.0 |
| Example | 1 | 2 | 3 | 4 | 5 | 6 | 7 | 8 |
| T g (°C.) | 57 | 63 | 61 | 64 | 13 | 11 | 55 | 60 |
| Streass at break (kg/cm$^2$) | 550 | 350 | 440 | 450 | 190 | 180 | 480 | 350 |
| Elongation at break (%) | 3.0 | 2.0 | 2.5 | 2.1 | 450 | 380 | 2.5 | 2.0 |
| Elongation retaining percentage (%) | 100 | 67 | 83 | 70 | 23 | 48 | 90 | 67 |
| Comparative Example | 1 |  | 2 | 3 | 4 | 5 | 6 |  |
| T g (°C.) | 50 |  | 50 | 12 | 14 | 60 | 63 |  |
| Stress at break (kg/cm$^2$) | 130 |  | 60 | * | 160 | 120 | 80 |  |
| Elongation at break (%) | 0.5 |  | <0.5 | * | 200 | 0.5 | 0.5 |  |
| Elongation retaining percentage (%) | 17 |  | <17 | * | 25 | 18 | 17 |  |

*not measured due to the gelation
Elongation retaining percentage (%) = (The elongation at break of the coating film after the grafting raction)/(the elongation at break of the coating film of the base resin) × 100

TABLE 7

| Coating film<br>Water resistanse | Example 1 | Example 3 | Example 4 | Example 6 | Comparative Example 1 | Comparative Example 5 | Comparative Example 6 |
|---|---|---|---|---|---|---|---|
| Evaluation at room temperature *1 | ○ | ○ | ○ | ○ | Δ | Δ | Δ |
| Evaluation under heating condition *2 | ○ | ○ | ○ | ○ | × | × | × |

*1 25° C. × 24 hours,
*2 60° C. × 1 hour
*Water resistance: ○; (No change), Δ; (Slightly turbid), ×; (White)

TABLE 8

| Coating film<br>Substrate | Base resin<br>A-1 | Example 1 | Example 3 | Example 5 | Example 6 | Example 7 |
|---|---|---|---|---|---|---|
| PET | | | | | | |
| Treated surface | ○ | ○ | ○ | ○ | ○ | ○ |
| Non-treated surface | ○ | ○ | ○ | ○ | ○ | ○ |
| PP | | | | | | |
| Treated surface | × | ○ | ○ | ○ | ○ | ○ |
| Ny | | | | | | |
| Treated surface | × | ○ | ○ | ○ | ○ | ○ |
| Non-treated surface | × | ○ | ○ | ○ | ○ | ○ |

*The coating films (having a film thickness of 10 μm) were obtained by applying the solutions of each of the base resin and the grafting reaction products to varous substrates. The adhesiveness to the substrates was evaluated by the checker cellophane adhesive tape peeling test (ASTM D-3359).

TABLE 9

| Coating film<br>Properties of the coating films | Example 9 | Example 10 | Comparative Example 7 | Comparative Example 8 |
|---|---|---|---|---|
| Base resin | A-1 | A-3 | A-1 | A-6 |
| Hardness | 4H | 2H | 3H | 3H |
| Gloss | Good | Good | Good | Good |
| Flexibility | 4T | 0T | 4T | 4T |
| Adhesiveness to the substrate | 100/100 | 100/100 | 100/100 | 100/100 |
| Solvent resistance | >50 | 50 | 20 | 50 |
| Water resistance | >95 | >95 | 70 | 70 |

(1) Tables 6 and 7 show that the grafting reaction product of the present invention makes it possible to retain the mechanical properties (the elongation at break of the coating film) and water resistance of the base resin, unlike the conventional grafting reaction products which do not have the side chain requirements of the present invention.

(2) Tables 3–5 show that the method for producing a grafting reaction product of the present invention controls the gelation and the increase in viscosity of the grafting reaction product at the time of the grafting reaction. The Tables further show that the method provides the high grafting efficiency of the product, as compared to the conventional method. Also, the Tables show that the use of the alternative copolymerizing property of the radical polymerizable monomers makes it possible to bring the actual composition of the grafted side chain near its original composition.

(3) Table 8 shows that the grafting reaction product of the present invention not only retains the adhesiveness of the base resin to various substrates, but creates good adhesiveness to the substrates in which the base resin does not have sufficient adhesiveness.

(4) Table 9 shows that the coating film obtained by blending the grafting reaction product of the present invention with a curing agent retains the excellent workability (flexibility) the base resin possesses, and has improved hardness, solvent resistance, and the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A grafting reaction product comprising:

a main chain including a polymer selected from one of a polyester and a polyester polyurethane consisting mainly of said polyester, said polyester having a weight average molecular weight from about 5,000 to about 100,000 and containing about 60 mole % or more of an aromatic dicarboxylic acid for the amount of total carboxylic acids; and a plurality of side chains including polymers of radical polymerizable monomers, said radical polymerizable monomers including at least 30% by weight of the combination of an electron accepting monomer (A) having an e value of about 0.9 or more and an electron donative monomer (B) having an e value of about −0.6 or less for the amount of total radical polymerizable monomers, and at least about 10% by weight of an aromatic radical polymerizable monomer for the amount of the total radical polymerizable monomers, said main chain and said plurality of side chains being selected to have a compatibility such that when a film is obtained from a solution of the polymer constituting said main chain and the polymer constituting said side chains, the film being formed under a drying condition of 120° C. for 10 minutes and having a thickness of about 100 μm, the film is transparent, and wherein said plurality of side chains are grafted into said main chain.

2. The grafting reaction product of claim 1, wherein said radical polymerizable monomers include about 20 to about 80% by weight of said electron accepting monomer (A), about 20 to about 80% by weight of said electron donative monomer (B), and 0 to about 50% by weight of a radical polymerizable monomer (C) other than said monomers (A) and (B), and said electron donative monomer (B) and said radical polymerizable monomer (C) include about 10 to about 80% by weight of said aromatic radical polymerizable monomer for the amount of the total radical polymerizable monomers.

3. The grafting reaction product of claim 1, wherein the polyester component in said main chain includes about 0.5 to about 20 mole % of a dicarboxylic acid having polymerizable unsaturated double bonds for the total carboxylic acids and/or about 0.5 to about 20 mole % of a diol having polymerizable unsaturated double bonds for the total diols, and the sum of said dicarboxylic acid and said diol is up to about 20 mole % for the total acids and diols.

4. The grafting reaction product of claim 1, wherein said polyester polyurethane has a weight average molecular weight of about 5000 to about 100000, and an urethane bond content of about 500 to about 4000 equivalents/$10^6$ g, and on average about 1.5 to about 30 of polymerizable unsaturated double bonds for one molecule of said polyester polyurethane.

5. The grafting reaction product of claim 1, wherein the weight ratio of the polymer constituting said main chain to said radical polymerizable monomers forming said side chains is about 25/75 to about 99/1.

6. The grafting reaction product of claim 1, wherein said grafting reaction product has an acid number of 200 to 4000 equivalents/$10^6$ g.

7. The grafting reaction product of claim 1, wherein the acid groups of said grafting reaction product are neutralized with a basic compound, and said grafting reaction product is dispersed in an aqueous medium.

8. A method for producing a grafting reaction product, comprising steps of:

adding to a main chain including a polymer selected from one of a polyester and a polyester polyurethane consisting mainly of said polyester a first side chain comprising radical polymerizable monomers having an e value of about 0.9 or more;

adding a second side chain comprising radical polymerizable monomers having an e value of about −0.6 or less and a polymerization initiator to the polymer and first radical monomers; and reacting said polymer with the first and second radical polymerizable monomers, said main chain and said plurality of side chains being selected to have a compatibility such that when a film is obtained from a solution of the polymer constituting said main chain and the polymer constituting said side chains, the film being formed under a drying condition of 120° C. for 10 minutes and having a thickness of about 100 μm, the film is transparent.

* * * * *